United States Patent [19]

Hadgraft et al.

[11] 3,779,857

[45] Dec. 18, 1973

[54] TEXTILE LAMINATING COMPOSITIONS AND COMPOSITE TEXTILE STRUCTURES LAMINATED THEREWITH

[75] Inventors: Robert B. Hadgraft, East Ridge; John J. Martin, Hixson, both of Tenn.

[73] Assignee: Standard Brands Chemical Industries, Inc., Dover, Mass.

[22] Filed: Apr. 27, 1972

[21] Appl. No.: 248,269

Related U.S. Application Data

[63] Continuation-in-part of Ser. No. 126,961, March 22, 1971, abandoned.

[52] U.S. Cl. ............... 161/88, 161/67, 161/159, 161/403, 260/17.4 ST
[51] Int. Cl. ............... B32b 25/10, B32b 25/16
[58] Field of Search ............... 161/67, 88, 159, 161/92, 403; 260/17.4 ST

[56] References Cited
UNITED STATES PATENTS

| | | | |
|---|---|---|---|
| 3,227,574 | 1/1966 | Mohr | 161/67 UX |
| 3,303,086 | 2/1967 | Demers | 161/159 |
| 3,485,776 | 12/1969 | Bruner et al. | 260/17.4 ST |
| 3,547,750 | 12/1970 | Bussac | 161/67 |
| 3,632,786 | 1/1972 | Nickerson | 260/17.4 ST |

*Primary Examiner*—William J. Van Balen
*Attorney*—Don O. Winslow et al.

[57] ABSTRACT

A latex composition especially suitable as a base for textile laminating compounds comprising (1) an elastomeric polymer latex and (2) a ternary mixture of granular starch, urea and borax in which the weight ratio of starch to urea is between about 1.2:1 and 5:1 and the weight ratio of starch to borax is between about 1.5:1 and 12:1. Up to about 40 parts by weight (basis 100 parts by weight of dry polymer solids) of the ternary mixture are contained in the latex to which extremely high levels of inorganic filler may be added while maintaining a high degree of strength for textile laminating applications.

10 Claims, No Drawings

TEXTILE LAMINATING COMPOSITIONS AND COMPOSITE TEXTILE STRUCTURES LAMINATED THEREWITH

CROSS-REFERENCE TO RELATED APPLICATIONS

This application is a continuation-in-part of applicant's copending application, Ser. No. 126,961 entitled NOVEL TEXTILE LAMINATING COMPOSITIONS AND COMPOSITE TEXTILE STRUCTURES LAMINATED THEREWITH, filed on Mar. 22, 1971 and now abandoned.

This invention relates to novel elastomer latex-based compositions which are particularly suited for the lamination of textiles.

In the manufacture of tufted carpeting, it is widely used practice to coat the back of the carpet, on which the bights of the tufts are exposed, with an adhesive. A principal function of this adhesive is to lock the tufts in place so that they are not pulled out in normal use. It is all also widely practiced to laminate a second layer of backing onto the adhesive. This secondary backing, as well as the primary backing, in many instances is woven jute, scrim or a woven or non-woven textile made of such synthetic materials as polypropylene, rayon, viscose, nylon, polyester, acrylics or mixtures thereof. Such secondary laminated backings greatly enhance the dimensional stability of the carpet to which they are applied and also give to the carpet a desirably stiffer hand. In other instances, the tuft-locking adhesive is also used to adhere a rubber foam backing to the back of the carpet. Usually, the foam backing is applied in the form of a filled latex mixture which is foamed by beating in air and dried and cured by the application of heat. Such foam backings also increase the dimensional stability of the resulting carpet structure. However, they impart a more flexible hand to the carpet and also a springiness when it is walked upon.

In order to obtain a desirable combination of stiffness and flexibility in a given laminated structure and also to obtain a more economical structure, it has been the practice to extend the laminating adhesive with a minor amount of starch. However, the amount of starch which can be used to extend latex compositions is severly limited becuase the starch reduces the adhesive properties of the latex. Consequently, in the past the latex could normally contain no more than about 10–20 percent by weight starch, basis latex polymer solids. When more than that amount of starch is used, the locking of the tufts is considerably weakened. In addition, the use of higher amounts of starch frequently results in a viscosity of the starch-latex mixture which is so high as to make it extremely difficult to apply. In particular, it does not flow adequately into the interstices of the carpet threads. Furthermore, the use of a starch-extended laminating composition containing too much starch results in an excessively stiff, boardy hand.

In addition, urea is sometimes used to plasticize the latex polymer, especially when it is starch extended, to mitigate the excessive stiffening effect of the starch. Urea is used for this purpose up to an amount corresponding to about 3–4 percent by weight, basis latex polymer solids. However, the urea, like the starch, also has the disadvantage of reducing the overall adhesiveness of the thusly extended laminating composition.

Applicants' invention, however, overcomes the disadvantages of the prior art use of starch and/or urea in this application by the addition of a third extender, borax. Though borax has no significant effect on the adhesiveness of the latex itself, when combined with the starch and urea in certain ratios, it surprisingly enhances to a quite significant degree the adhesiveness of the total laminating composition.

Applicants' invention is a novel composition for the laminating of textiles comprising (1) an elastomeric polymer latex and (2) a ternary mixture of modified starch, urea and borax in which the weight ratio of starch to urea is between about 1.2:1 and 5:1 and the weight ratio of starch to borax is between about 1.5:1 and 12:1. Latex polymers containing up to about 40 parts by weight (basis latex polymer solids) of the starch-urea-borax ternary extender can be extended with up to 600 parts by weight (pbw) of inorganic filler.

A still further advantage of the composition of the invention is that it possesses excellent "high ride" and "early bonding" characteristics. As used within the context of textiles, the term "high ride" means that the compounded adhesive upon application to the back of a textile will not penetrate excessively into or through the weave of the fabric, but will nevertheless flow adequately into the interstices of the backing to effect good bonding with the textile without penetrating to the face of the textile substrate. The term "early bonding" refers to the property of the composition to become highly tacky and adherent to the substrate at temperatures well below the maximum temperatures obtained during curing and drying The type of polymer latex is not particularly critical in that a wide variety of elastomeric polymer latices are used for laminating of textile and these may also be used in the composition of the invention. For example, natural rubber latex, mixtures of natural latex with cold SBR latex and other synthetic latices may be used. Predominantly cis-polyisoprene latex may be used and carboxylated butadiene-containing latices are quite desirable for this purpose in that they require little, if any, separate curing agents. Such latices do, however, have to be curable by the application of heat at a temperature below the thermal degradation temperature of the textile to which they are applied. Curing temperatures of 300°F. or below are therefore preferred.

Elastomeric polymers in which the polymer chain contains various functional groups pendant from the chain exhibit the desired low-temperature curing property without the addition of curing agents, though conventional curing agents may be used if desired. Such polymers are made by the emulsion interpolymerization of a conjugated diene, such as butadiene, with, inter alia, an ethylenically unsaturated functional monomer such as an $\alpha, \beta$-unsaturated carboxylic acid, mono-esters of such dicarboxylic acids, acrylamides and N-methylol acrylamides. In addition to the conjugated diene and the functional monomer, the polymerization mixture should also contain at least one secondary copolymerizable monomer such as styrene, acrylonitrile, methyl methacrylate, vinylidene chloride and the like.

Though the secondary monomer is not critical with respect to the operability of the invention, it will, of course, be recognized by those skilled in the art of polymerization that the relative amount of secondary copolymerizable monomer determines in large part the basic hand characteristics imparted to any laminated textile. That is, hard latex polymer containing relatively high amounts of secondary monomer will impart a stiff hand to the textile. Whereas, a soft latex polymer containing relatively low amounts of secondary monomer will impart a softer hand, i.e more flexibility to the laminated textile. Though it is quite easy to devise a polymer to meet each desired hand characteristic by adjustment of the amount of secondary monomer, it will ordinarily be preferred to employ a mixture of hard and soft polymer latices to obtain a hand of intermediate stiffness. For example, a latex copolymer containing 45 percent wt. styrene monomer results in a rather soft polymer. On the other hand, a latex copolymer contains 65 percent wt. styrene monomer yields a quite hard polymer which is unsuitably stiff in this application. These two latices may, however, be blended in various proportions to produce a latex mixture which, when applied to a substrate, produce a polymer film which is intermediate in stiffness. Whether a soft latex alone is used or blends of hard and soft latices are used, it is preferred that the weight proportions of conjugated diene and secondary monomer be about 40–75 and 25–60 pbw respectively. Proportions by weigth of 45–70 butadiene and 30-50 secondary monomer are still further preferred.

Such copolymer latices can be prepared by conventional aqueous emulsion polymerization techniques, including those polymerization processes in which a small quantity of polymer latex is charged initially to the reactor to serve as a nucleating site for polymerization. Such seeding techniques may be used when it is desired to obtain larger average latex particle size.

The starch to be used in the composition of the invention must be one which does not result in excessively high viscosity when mixed with the aqueous latex and inorganic filler. Both root and cereal starches may be used so long as they are granular and are cold water-insoluble. Within this limitation, the starch may be either unmodified or modified as by oxidation, acid treatment, ethoxylation and the like. Dextrins may be employed as well so long as the lowering of molecular weight is not so great as to preclude its granularity or to increase its cold water solubility above about 30 percent (preferably no more than about 20 percent). It is, however, preferred to employ a starch which has been modified by oxidation or other chemical modification, which lowers the molecular weight of the natural starch.

A preferred method of preparing such a modified starch is by a wet modification which involves treating an aqueous starch suspension of about 36 percent solids with a hypochlorite solution having 6–8 percent active chlorine and containing a slight excess of alkali. The hypochlorite solution is added in small portions so that the heat generated can be dissipated by a cooling system and the temperature maintained between 90° and 125°F. When a product of the desired fluidity is obtained, the oxidation is stopped by adding an antichlor such as sodium bisulfite and the slurry is neutralized, filtered, washed and dried.

Another method for preparing a suitable modified starch is by the wet modification of starch suspended in dilute sulfuric acid (0.1 to 0.2 N) by heating it at about 50° to 55°C. until the paste viscosity is in the desired range. It is then neutralized, filtered, washed and dried.

Still another method of preparing such a modified starch is the dry modification thereof by adding thereto about 0.03 to about 0.04 percent hydrochloric acid in the form of an about 16 percent aqueous solution. This mixture is roasted at a relatively low temperature in the range of 250° to 400°F. until the solubles content thereof, in distilled water at 25°C., is in the desired range, e.g., about 3–5 percent by weight; and until its gram viscosity is in the desired range, e.g., about 25–27 grams.

Other methods that result in modified starches having suitable viscosities and solubilities may also be employed. It is also within the contemplation of this invention to utilize combinations of modified starches and starch products exhibiting suitable viscosities and solubilities.

The urea for use in the invention preferably should be of high purity, i.e. it should have an activity of at least 99.5 percent and should contain no more than the following stated amounts of impurities: $NH_3$, 300 ppm; Fe, 1.3 ppm; moisture, 0.5 ppm. Agricultural grades of urea have been found to be unsuitable to the extent that they incur latex destabilization.

It should be noted that laminating compositions for this type of use invariably contain a large amount of finely divided inorganic filler such as whiting ($CaCo_3$), barytes, alumina, pigments and the like. These materials are added to impart certain secondary properties such as opacity, fire retardance, stiffness and color. Such materials and mixtures thereof are usually used in an amount corresponding to at least 100 parts by weight, basis latex polymer solids. Higher amounts, for example, 700 parts by weight, may be used in the invention, but no more than about 400 parts by weight are preferred. In general the composition will contain from about 150 to 350 parts by weight inorganic filler.

In addition to the foregoing components, the composition of the invention can also contain various supplemental plasticizers. The predominant purpose of such materials is to adjust the degree of plasticization of the cured films produced from the composition. These are solvent-type plasticizers, i.e. rather high boiling, normally liquid organic compounds which are chemically inert toward the polymer, but in which the copolymer is at least partially soluble and will therefore be readily softened by contact with the plasticizer. Appropriate plasticizers of this type include naphthenic and aromatic petroleum oils and synthetic organic compounds such as ester plasticizers and liquid polymers. Suitable ester-type plasticizers include the following: hexylene glycol, dimethyl phthalate, dibutyl phthalate, chlorinated diphenyls, tributyl phosphate and di-carbitol phthalate, dibutoxy-glycol phthalate, dimethoxyglycol phthalate, butyl phthalyl butyl glycolate, methyl phthalyl ethyl glycolate, triglycol di-2-ethylbutyrate, triglycol di-2-ethylhexoate and phosphate-type plasticizers such as tributoxyethyl, tricresyl, triphenyl, diphenyl octyl, diphenyl cresyl, tris-dichloropropyl, tris-chloroethyl, tris-dibromopropyl, and tris-dichloroisopropyll phosphates. Low molecular weight water-insoluble polyalkylene glycols, e.g. polypropylene glycols, are also suitable plasticizers. Liquid polymers which can be used as plasticizers include liquid polybutylenes, liquid polybutadienes and polyesters. It will, however, be recognized that plasticizers may also function as a supplemental extender.

In addition to the above-referred primary functional components, the composition of the invention may also contain various secondary components such as antioxidants, defoamers, bactericides, emulsifiers, thickeners, dispersants and the like.

In the application of the compositions of the invention for the laminating of textiles, the viscosity of the composition is relatively important. As an illustration, if the viscosity is too low excessive penetration through the fabric may take place. Conversely if the viscosity is too high, proper distribution of the laminating composition over the textile may be inhibited. The preferred viscosity is highly subjective to the particular coating equipment which is being used. However, Brookfield viscosities of between 5,000 and 2,000 are prevalent. In many instances it will be desired to raise the viscosity of the composition by incorporating into it a water-soluble thickening agent.

It has also been found that some starch-containing latex compositions tend to undergo significant thickening when they are stored at ambient temperatures for a few days. This upward drift in viscosity too can be avoided by the use of water-soluble polymeric thickening agents. Preferred thickening agents are those which can perform the functions of both adjustment and stabilization of the viscosity. These include polyacrylates, hydrolyzed polyacrylonitriles and salts of both such polymers and various alkyl ethers of cellulose such as hydroxypropyl methyl cellulose and hydroxyethyl methyl cellulose. However, it has been found in the case of the composition of the invention that such polymers are less effective unless the average size of the polymer particles in the latex are at least about 10,000–15,000 A (measured by light scattering techniques). When the average latex particle size is below this level, it is preferred to use the sodium salt of hydrolyzed polyacrylonitrile.

The advantages of the invention will be made apparent by reference to the following examples:

EXAMPLE I

A borax solution having a concentration of about 20 percent wt. borax is prepared by adding finely divided borax to water heated to a temperature of 175°F. All of the borax was dissolved and the solution was maintained at a temperature of at least 120°F.

EXAMPLE II

A starch slurry having a concentration of about 46 percent wt. was prepared by adding a powdered, acid-modified, granular starch to water at room temperature. The starch was maintained in slurried dispersion by continuous agitation.

EXAMPLE III

A series of polymer latices was prepared by aqueous emulsion polymerization in the presence of a free radical-initiating catalyst. Each of the polymerizations was conducted by emulsion polymerization methods well known in the art of polymerization and each polymerization was carried out to at least about 90 percent monomer conversion. Upon completion of polymerization, each of the resulting latices were stripped to remove any residual amounts of monomer and to concentrate the latices to a polymer solids content of about 50 wt. The compositions of the resulting latices, basis charged monomer, were as follows:

TABLE 1

Composition of Latex Polymers

| Monomer | Butadiene (% wt.) | Styrene (% wt.) | Polymerizable Carboxylic Acid (% wt.) |
|---|---|---|---|
| Polymer A | 50 | 47 | 3 |
| B | 32 | 65 | 3 |
| C | 50 | 47 | 3 |
| D | 32 | 65 | 3 |
| E | 44 | 53 | 3 |
| F | 50 | 47 | 3 |
| G | 70 | 30 | — |

EXAMPLE IV

To three separate samples of the latex of Polymer A were added (1) 5 pbw of naphthenic petroleum oil (2) various combinations of starch, urea and/or borax, and (3) inorganic filler (whiting). The Brookfield viscosity of each compound was adjusted to 12,000 cps (No. 5 spindle, 20 rpm) by the addition of a polymeric thickening agent, namely polyacrylonitrile. Each of these filled latex compounds was used to laminate jute to the back of a standard tufted carpeting (Nylon loop pile tufted to jute backing). The lamination was prepared by roller coating the backing of the carpet with the laminating compound at a weight of 28 oz/yd$^2$ of carpet, and then laminating jute to the wet coating. The resulting lamination was cured and dried by heating at 270°F. for 15 minutes. The resistance of the laminated structure to delamination and the tuft-locking effectiveness of the backing were then determined by the below-described procedures:

Stripback (Resistance to Delamination)

A 3 × 12 inches sample of the laminated carpet is prepared and about one inch of the jute secondary backing is separated from the carpet by hand pulling. The delaminated end of the substrate is placed in the stationary vise of a Scott Tensile Tester and the delaminated end of the jute backing is placed in the movable vise. The backing is then pulled at a fixed rate and the average tensile force recorded. At least duplicate samples are run and the results averaged.

Tuftlock Value

A 3 × 12 inches sample of the laminated carpet is prepared with the tuft bights running lengthwise of the sample. The sample is then placed in an Instron Tensile Tester so that the tufts are pulled from the backing. At least five pulls are made and the average of the tensile forces to remove the tufts is calculated. The results of the strength tests were as follows:

TABLE 2

Reinforcement Effect of Starch, Urea, Borax

| | Compound No. | | |
|---|---|---|---|
| Composition: | 1 | 2 | 3 |
| Polymer solids, pbw | 88 | 75 | 75 |
| Filler, pbw | 375 | 375 | 375 |
| Naphthenic Oil, pbw | 5 | 5 | 5 |
| Urea, pbw | 7 | 7 | 7 |
| Starch, pbw | — | 13 | 11 |
| Borax, pbw | — | — | 2 |
| Stripback, lb. | 9.4 | 8.0 | 10.5 |
| Tuftlock, lb. | 8.7 | 8.0 | 9.5 |

The above tests show that the use of either urea or a mixture of starch and urea as an extender substantially reduced both stripback and tuftlock. However, the inclusion of borax in place of only 2 parts of the starch enhanced both of these important strength properties.

EXAMPLE V

A series of laminating compounds was prepared from each of Polymers A through G. In addition, corresponding compounds were prepared from a natural rubber latex and from an 80/20 by wt. mixture of Polymers A and B. Each of the compounds contained 20 parts by weight (basis dry polymer solids) of the ternary extender comprising starch, 11 pbw, urea, 7 pbw and borax 2 pbw. To each of the latices were added 375 pbw whiting filler and 5 pbw naphthenic oil and the viscosity of each filled compound was adjusted to 12,000–13,000 cps Brookfield Viscosity (room temperature, No. 5 spindle, 20 rpm). Portions of each sample were then used at a weight of 28 oz./yd. to laminate a jute secondary backing to Nylon loop pile tufted to a jute primary backing. Using the laminating and testing procedures of Example IV, the Stripback and Tuftlock values of each lamination were determined and compared with the laminated compositions of Example IV in which only urea and starch/urea were employed (Compounds 1 and 2).

TABLE 3

Latex Polymer Variations

| Starch, Urea, Borax Compounds Polymer No. | Stripback Value (lb.) | Tuftlock Value (lb.) |
|---|---|---|
| A | 13.0 | 10.0 |
| B | — | — |
| C | 17.0 | 10.0 |
| D | — | — |
| E | 14.0 | 10.0 |
| F | 11.0 | 9.0 |
| G | 9.5 | 8.0 |
| Natural Rubber Latex | 10.0 | 8.0 |
| 80/20 Mixture of A/B | 12.0 | 9.0 |
| Starch, Urea Only | 8.0 | 8.0 |
| Urea Only | 9.4 | 8.7 |

The above data (Polymers A, C, E, F) show that latex copolymers having pendant functional groups, such as carboxylic acid groups, result in a significantly higher degree of strip-back and tuftlock enhancement when the ternary extender is used. Nevertheless, the ternary extender is also operative with natural latex and with conventional SBR cold latex, neither of which contains such functional pendant groups.

Polymers B and D, both of which are hard polymers, by themselves produced laminations which were excessively stiff and boardy and were therefore not tested. Nevertheless, as shown by the data on the mixture of Polymers A and B, these hard polymers may be used successfully in combination with soft polymers to obtain intermediate hands and, when this is done, the enhancement to stripback and tuftlock by the ternary extender is apparent.

EXAMPLE VI

In this example a series of laminating compounds was prepared using the ternary extender with a naphthenic oil and Polymer A at various filler levels. The sampling, laminating and testing procedures were the same as for Example IV.

TABLE 4

Effect of Filler Level

| Filler Level (pbw) | Stripback Value (lb.) | Tuftlock Value (lb.) |
|---|---|---|
| 200 | 20.0 | 12.0 |
| 275 | 18.0 | 10.0 |
| 300 | 14.0 | 10.0 |
| 325 | 12.0 | 9.0 |
| 350 | 12.0 | 9.0 |
| 375 | 12.0 | 9.0 |
| 500 | 8.0 | 6.0–7.0 |

The above data show that the ternary extender can be used to filler levels as high as 600 pbw, even though stripback and tuftlock values appear to drop significantly above about 400 pbw filler. Nevertheless, the ternary extender is comparable in effectiveness at 500 pbw filler to the use of starch and urea at only 375 pbw filler. It is apparent from these data and the data in Example 5 that maximum useful filler levels for the composition of the invention are also related to the adhesive properties of the latex monomer. Thus, in some instances, filler levels of 700 pbw or even higher may be used in accordance with the invention. Filler levels of no more than about 500 pbw are preferred and a maximum of about 400 pbw is particularly preferred.

It will be appreciated that the ternary extender may be used at even lower levels of filler, e.g. 50 and 100 pbw. However, the need to use the ternary extender is normally not so great at such low filler levels.

EXAMPLE VII

In the foregoing examples, the starch component of ternary extender was a granular acid-modified corn starch. This starch is cold-water insoluble and therefore forms low-viscosity slurries which can readily be admixed with the latex either before or after filler addition. Because pregelatinized starches form viscous gel-like dispersions in water in the concentrations which are desired, they can not readily be used in the invention. However, it will be recognized that gelatinization of the granular starches takes place when the aqueous laminating compound is heated to effect drying and curing.

To confirm the general applicability of granular, cold water-insoluble starches in the practice of the invention, a series of laminating compounds was prepared in accordance with the procedure of Example IV in which several different types of starch were separately substituted for the acid-modified starch and compared therewith. All had cold-water solubility of below 30%. Upon testing the resistance to stripback, each of the starches were found to give stripback values equal to or higher than the acid-modified corn starch.

TABLE 5

Starch Variations

| Starch Type | Stripback Value (lb.) |
|---|---|
| Corn, acid-modified, granular | 13.0 |
| Corn, unmodified, pearl | 13.0 |
| Potato, unmodified, granular | 14.0 |
| Tapioca dextrine, granular | 16.0 |
| Corn, hydroxy ethylated, granular | 16.0 |

The foregoing results show that both root and cereal starches, whether modified or unmodified, may be used in the invention at least so long as they are cold water-insoluble and granular. It is interesting to note that when it was attempted to use a pregelatinized wheat starch, a paste-like gel resulted which could be incorporated into the compound only by economically impracticable means.

EXAMPLE VIII

A series of tests was made in which the ratio of starch to borax was varied over wide limits at otherwise constant conditions, viz. using a latex of polymer A to make a compound containing 350 pbw filler and 20 pbw ternary extender containing 7 pbw urea and applying the compound to laminate a jute secondary backing to loop pile Nylon on a jute primary backing in the same manner as Example IV. The results of the strip-back and tuftlock tests were as follows:

TABLE 6

Variations on Ratio of Starch to Borax

| Starch, pbw | 8 | 10.5 | 11 | 11.5 | 12 |
|---|---|---|---|---|---|
| Borax, pbw | 5 | 2.5 | 2 | 1.5 | 1 |
| Starch/Borax Ratio | 1.6 | 4.2 | 5.5 | 7.7 | 12 |
| Stripback Value, lbs. | 9.0 | 12.5 | 12.5 | 12.8 | 10.0 |
| Tuftlock Value, lbs. | 8.8 | 9.5 | 9.7 | 10.2 | 10.1 |

These data show that starch-borax ratios of from as low as about 1.5:1 to as high as about 12:1 may be used effectively in the laminating composition of the invention. Optimum properties are obtained with starch /borax ratios of from about 3:1 to about 10:1 and especially from about 4:1 to about 9:1.

EXAMPLE IX

A further series of tests was made in which the ratio of starch to urea was varied over wide limits at the same conditions as the immediately preceding example except that the ternary extender contained a constant 2 pbw borax and the starch/urea ratio was varied as shown. The results of the strip-back and tuftlock tests were as follows:

TABLE 7

Variations on Ratio of Starch to Urea

| Starch, pbw | 9 | 10 | 11 | 13 | 15 |
|---|---|---|---|---|---|
| Urea, pbw | 9 | 8 | 7 | 5 | 3 |
| Starch/Urea Ratio | 1.0 | 1.25 | 1.6 | 2.6 | 5.0 |
| Stripback Value, lbs. | 12.5 | 13.8 | 12.5 | 13.8 | 9.5 |
| Tuftlock Value, lbs. | 7.5 | 9.5 | 9.7 | 9.5 | 9.9 |

The data from this series of tests indicate that starch/urea ratios of from about 1.2:1 to about 5:1 are useful with a range of from about 1.25:1 to about 4:1 being preferred.

It will be noted in the foregoing examples that it was unnecessary to make up the ternary extender separately and that the ternary extender was incorporated into the compound merely by adding appropriate amounts of the heated borax solution (Example I), starch slurry (Example II) and urea directly to the latex. For ease in obtaining good mixing, it is preferred to add the components of the ternary mixture and any other ancillary materials, such as the naphthenic oil, prior to addition of the filler. The components of the ternary mixture may be added, however, either separately or in admixture with one or both of the other components thereof so long as the starch component is maintained as a temperature such that it remains water-insoluble prior to drying and curing of the applied laminating compound.

I will also be observed from the examples that a small amount of naphthenic oil was used in formulating the laminating compounds of the invention. The inclusion of this oil is, however, purely optional. The extender oil does not observably interact with the ternary extender. When the oil is omitted without further change, the compounds studied merely exhibit higher strength properties which are consistent with and therefore to be expected from decreasing the degree of extension. In most instances, the oil may be added to plasticize the latex polymer beyond that level of plasticization which is achieved by the urea component of the ternary extender alone.

In commercial scale experimental tests in which the laminating compositions of the invention were used to laminate a secondary backing, it was found that the compositions had excellent high ride characteristics and good heat aging characteristics as well. The composition of the invention have generally been found to possess good heat aging properties when subjected to accelerated aging at 270°F for 96 hours.

An important property of the composition of the invention, not readily discernible from laboratory-scale testing, is that of "early bonding." This is the ability of the composition to achieve a highly tacky state at comparatively low temperatures. Thus the term "early bonding" connotes the fact that the compositions become highly adhesive quite early in the curing and drying step, well before maximum curing temperatures are attained. This property is important because of the flexing and stretching action which the green laminate is subjected to in the continuous laminating equipment characteristic of commercial textile operations. In the compositions of the invention, early bonding is brought about by the presence of the borax in the ternary extender which lowers the temperature at which the granular starch becomes gelatinous and therefore highly tacky and adherent. In commercial-scale operations this property of the invention has been observed by the reduced incidence of secondary backing delamination as compared with conventional starch-extended laminating compositions.

Quite surprisingly, the composition of the invention has been found to possess a marked synergistic effect on the degree of flame retardance imparted by conventional flame retardant fillers such as aluminum trihydrate. This further benefit may be seen from the data in the following example:

EXAMPLE X

A latex composition in accordance with the invention was prepared by admixing a 20 percent wt. borax decahydrate solution, dry urea and a 46 percent wt. granular starch slurry with carboxylated butadiene/styrene latex containing about 50 percent wt. polymer solids. Small amounts of a 66 percent wt. naphthenic petroleum oil emulsion and sodium polyacrylate thickening agent were also added to the latex containing the ternary mixture thus yielding a latex composition having the following composition on a dry basis:

| | Parts by Weight (dry basis) |
|---|---|
| Latex polymer | 100.0 |
| Borax decahydrate | 2.7 |
| Urea | 9.3 |
| Starch | 14.7 |
| Petroleum Oil | 6.7 |
| Sodium polyacrylate | 0.1 |
| | 133.4 |

A further series of three special latices was prepared in the same manner as described above except that one of each of the components of the ternary mixture was omitted from the latex composition.

From the latex composition according to the invention, the three special latices and a sample of the neat latex containing none of the above-described additives, a series of filled laminating compounds was prepared by addition to each of the five latices of 1.8 parts by weight sodium polyacrylate, 466.9 parts by weight alumina trihydrate filler and enough water to bring the composition to 70 percent by weight total solids. (The above quantities were on the basis of 100 parts by weight latex polymer solids.)

A small portion of each of the five laminating compounds was then taken and thin films were prepared therefrom. Each of the five films was air dried and oven cured for one hour at 190°F and 20 minutes at 270°F. The resulting films were then tested in accordance with ASTM-D-2863-70 Specifications for Flammability of Plastics Using the Oxygen Index Method. A sample size of $0.5 \times 3 \times 0.060$ inch ($\pm 0.015$ inch) was employed and the Limiting Oxygen Index (LOI) of each sample was measured as a measure of fire retardance.

In this test, the sample to be tested is placed in a burning chimney having a regulatable supply of oxygen and nitrogen such that the atmosphere flowing through the burning chimney can be regulated from 0 to 100 percent oxygen. The sample is ignited with a small gas flame at a given oxygen level. If the sample fails to burn, as indicated by a 50 mm flame or continuous burning for at least 180 seconds, the test is repeated at successively higher oxygen levels until sustained combustion is obtained. The Limiting Oxygen Index (LOI) is therefore the minimum percentage of oxygen in the atmosphere which, under the test conditions and criteria, will support combustion of the sample. Thus, LOI is inversely related to flammability and directly related to flame retardancy of the samples tested.

The results of LOI testing on the above-described materials are given in the following table:

TABLE 8

Limiting Oxygen Index of Alumina Trihydrate-Filled Laminating Compounds

| Component | Parts by Weight, basis dry solids | | | | |
|---|---|---|---|---|---|
| Latex Polymer | 100 | 100 | 100 | 100 | 100 |
| Borax decahydrate | — | — | 2.7 | 2.7 | 2.7 |
| Urea | — | 9.3 | — | 9.3 | 9.3 |
| Granular starch | — | 14.7 | 14.7 | — | 14.7 |
| L.O.I. | 41.00 | 47.25 | 45.50 | 47.00 | 53.25 |

It was interesting to note that the presence of any two of three components of the ternary mixture raised the L.O.I. of the filled compound by 14–15 percent. However, the presence of the complete ternary mixture comprising starch, urea and borax raised the L.O.I. of the filled compound by over 29 percent, thus markedly improving the effectiveness of the alumina trihydrate to impart flame retardancy to the laminating compound.

This surprising effect may also be shown when other fillers are present as is demonstrated by the following example.

EXAMPLE XI

Using a quantity of the same base carboxylated styrene-butadiene latex as in the previous example, one portion thereof was formulated into a latex composition in accordance with the invention as in Example X. One-half of this composition was then blended with an equal amount of the base latex to form a 50/50 blend of formulated latex (containing the ternary mixture) and base latex. Three portions each of (a) base latex, (b) the 50/50 blend and (c) formulated latex were then compounded with 1.9 parts by weight sodium polyacrylate thickner and 466.9 parts by weight of inorganic filler. The inorganic fillers used were a series comprising various ratios of alumina trihydrate and calcium carbonate (Whiting).

Each of the fifteen samples produced in this manner was cast into a thin film, air dried and oven cured in the same manner as in Example X. The Limiting Oxygen Index was then determined for each film by the ASTM procedure described in Example X, the results of which are given in the following table:

TABLE 9

Effect of Filler Composition Upon Limiting Oxygen Index of Various Laminating Compounds

| Filler Composition $Al_2O_3 \cdot 3H_2O$ % by wt., basis total filler | $CaCO_3$ | Limiting Oxygen Index (LOI) of Filled Compounds Base Latex Only | 50/50 Blend of Base and Latex Containing Ternary Mixture | Latex Containing Ternary Mixture |
|---|---|---|---|---|
| 100 | 0 | 41.25 | 44.50 | 49.75 |
| 71.4 | 28.5 | 33.00 | 36.00 | 39.00 |
| 50 | 50 | 28.75 | 31.50 | 33.25 |
| 28.6 | 71.4 | 25.00 | 27.75 | 28.75 |
| 0 | 100 | 22.00 | 22.75 | 24.75 |

As would be expected from the data in Example X, the compounds using the ternary mixture in the base latex had greater fire retardancy than the compounds using only the base latex or the 50/50 blend of base and latex containing the ternary mixture. However, by comparison of the LOI of all three test specimens at each level of Whiting addition, it is apparent that the ternary mixture component exerts a synergistic effect on the calcium carbonate filler when it is used at levels between about 30 and 90 percent with the alumina trihydrate. From this, it is apparent that with the composition of the invention greater relative amounts of Whiting, which is more economical, may be used with concomitantly less alumina trihydrate to achieve a given level of fire retardance in laminating compounds prepared therefrom.

What is claimed is:

1. A composition for the lamination of textiles comprising (1) an elastomeric latex and (2) up to about 40 parts by weight, basis 100 parts by weight of dry polymer solids, of a ternary extender consisting of granular, cold water-insoluble starch, urea and borax in which the weight ratio of starch to urea is between about 1.2:1 and about 5:1 and the weight ratio of starch to borax is between about 1.5:1 and about 12:1.

2. The composition of claim 1 which contains from about 100 to about 700 parts by weight of inorganic filler and from about 10 to about 40 parts by weight of the ternary extender.

3. The composition of claim 1 in which the composition also contains a minor amount of hydrocarbon extending oil.

4. The composition of claim 1 in which the weight ratio of starch to urea is between about 1.25:1 and about 4:1.

5. The composition of claim 1 in which the weight ratio of starch to borax is between about 3:1 and about 10:1.

6. The composition of claim 1 in which the weight ratio of starch to urea is about 65/35 and the weight ratio of starch to borax is about 85/15.

7. A composite textile structure comprising a primary textile layer having bonded thereto a dried and cured layer of the laminating composition of claim 1.

8. A composite textile structure comprising a primary textile layer and a secondary backing layer, the secondary layer being bonded to the primary layer by means of a dried and cured intermediate layer of the laminating composition of claim 1.

9. The composite textile structure of claim 8 in which the secondary backing layer is a woven or non-woven textile.

10. The composite textile structure of claim 8 in which the secondary backing layer is a foam rubber layer.

* * * * *

UNITED STATES PATENT OFFICE
CERTIFICATE OF CORRECTION

Patent No. 3,779,857          Dated December 18, 1973

Inventor(s) Robert B. Hadgraft et al.

It is certified that error appears in the above-identified patent and that said Letters Patent are hereby corrected as shown below:

Column 5, line 12; "2,000" should read --20,000--

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents